W. P. DU CHEMIN.
METALLIC CULVERT.
APPLICATION FILED MAY 23, 1913.

1,083,242.

Patented Dec. 30, 1913.

Witnesses:
Geo. Johnson
Wm. J. Stingley

William P. DuChemin
Inventor
by James W. See
Attorney

United States Patent Office.

WILLIAM P. DU CHEMIN, OF MIDDLETOWN, OHIO, ASSIGNOR TO THE AMERICAN ROLLING MILL COMPANY, OF NEWARK, NEW JERSEY.

METALLIC CULVERT.

1,083,242.

Specification of Letters Patent.  Patented Dec. 30, 1913.

Application filed May 23, 1913.  Serial No. 769,508.

*To all whom it may concern:*

Be it known that I, WILLIAM P. DU CHEMIN, a citizen of the United States, residing in Middletown, Butler county, Ohio, have invented certain new and useful Improvements in Metallic Culverts, of which the following is a specification.

In very late years metallic pipes made of iron with corrugations extending circumferentially around the pipe have provided of high efficiency for culvert uses. Such culverts are from eight inches to eighty-four inches in diameter and in very many cases, as in railroad and highway work the ends of the culverts project endwise more or less beyond embankments. While such culverts are, by reason of their corrugated form, adapted to stand very severe loads, the edges of the projecting ends of the culverts are not well calculated to withstand the rather severe punishment to which they are sometimes subjected, as by being struck by rocks, vehicles, etc., the result being that the ends of the culverts often become deformed and unsightly.

My present invention relates to a system for reinforcing the exposed ends of such culverts, and the invention will be readily understood from the following description taken in connection with the accompanying drawing in which:—

Figure 1:
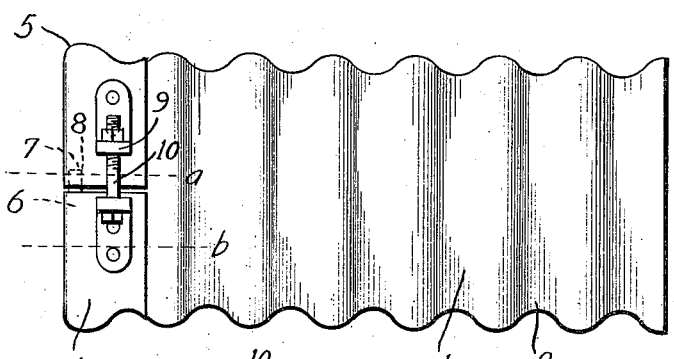
Figure 2:
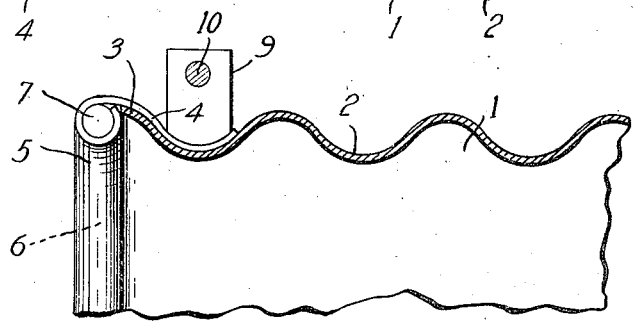
Figure 3:
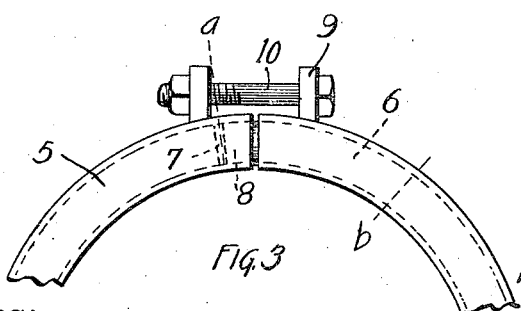

Figure 1 is an elevation of a section of corrugated metallic culvert having one of its ends provided with a system of reinforcement embodying my invention: Fig. 2 a diametrical section of a portion of the same, upon an enlarged scale, in the plane of line *a* of Figs. 1 and 3: Fig. 3 an end elevation of a portion of the culvert; and Fig. 4 a section similar to Fig. 2 in the plane of line *b* of Figs. 1 and 3, Fig. 4 illustrating the construction in a form somewhat modified as compared with the construction shown in the other figures.

In the drawing:—1, indicates the pipe, 2, the valleys of the corrugations, 3, one end of the pipe, the end being at the crest of the hill of the final corrugation, 4, a band formed of sheet metal and encircling the end of the pipe which is to be reinforced, this band fitting the first slope and the valley of the first corrugation, the band being formed of sheet metal having a joint in one portion of its circumference: 5, a roll, formed inwardly at the outer end of the band: 6, a rod inclosed in the roll of the band: 7, a socket formed in roll 5 at one side of the joint of the band; this socket being formed by shortage in rod 6, that is to say, the end of the rod does not reach to the joint in the band: 8, a tenon entering socket 7 and formed by prolonging the end of the rod beyond the joint in the band: 9, ears secured to the band at each side of the joint in the band: 10, a draw-bolt engaging the ears and serving to draw the band firmly to position on the pipe; and 11, rivets uniting the band to that portion of the pipe overlain by the band.

The reinforcement by the rodded band strengthens the end of the pipe in an obvious manner and the engagement of the band with the first slope of the first corrugation permits of the band being secured to the pipe with great firmness. The projecting of the rod at one side of the joint of the band into the socket at the other side of the joint gives extreme stiffness to the roll of the band.

Figure 4:
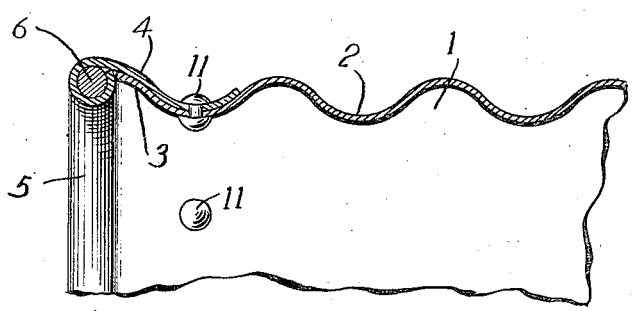

The band, illustrated in Figs. 1, 3 and 4 may readily be applied to a pipe before the pipe is located as a culvert, by merely opening the band and applying it to the end of the pipe and then utilizing the draw-bolt, a band may thus be applied to all culverts in exposed situations, it being, of course, necessary, to first correct any serious deformities which would interfere with the proper fitting of the band. In the fixing of these corrugated culverts, it cannot always be known in advance just how long the culverts will be, and the draw-bolt system of applying the band provides for the convenient attachment of the reinforcement even on new work being placed in position. In cases where it is known in advance what the length of the culvert will be so as to know where the reinforcements are to come, then, instead of employing the draw-bolt, the reinforcing band may be clamped in place on the pipe by any convenient means and then riveted as indicated in Fig. 4, this band being more economical than the other and the application of the band in this form being peculiarly applicable as a shop operation, that is to say, the application of the reinforcing band as a step in the manufacture of the pipe.

I claim:—

1. A metallic culvert comprising, a circumferentially corrugated pipe, a band secured to the end of the pipe and engaging the end corrugation thereof and projecting beyond the end of the pipe, and a roll formed by that portion of the band projecting beyond the pipe, combined substantially as set forth.

2. A metallic culvert comprising, a circumferentially corrugated pipe, a band secured to the end of the pipe and engaging the end corrugation thereof and projecting beyond the end of the pipe, a roll formed by that portion of the band projecting beyond the pipe, and means for drawing the ends of the band together to cause the band to forcefully clasp the pipe, combined substantially as set forth.

3. A metallic culvert comprising, a circumferentially corrugated pipe, a band secured to the end of the pipe and engaging the end corrugation thereof and projecting beyond the end of the pipe, a roll formed by that portion of the band projecting beyond the pipe, ears projecting outwardly from the ends of the band, and a draw-bolt passing through said ears and serving to draw the band into forceful engagement with the pipe, combined substantially as set forth.

4. A metallic culvert comprising, a circumferentially corrugated pipe, a band secured to the end of the pipe and engaging the end corrugation thereof and projecting beyond the end of the pipe, and an inwardly projecting roll formed by that portion of the band projecting beyond the pipe, combined substantially as set forth.

5. A metallic culvert comprising, a circumferentially corrugated pipe, a band secured to the end of the pipe and engaging the end corrugation thereof and projecting beyond the end of the pipe, a roll formed by that portion of the band projecting beyond the pipe, and a rod inclosed by said roll, combined substantially as set forth.

6. A metallic culvert comprising, a circumferentially corrugated pipe, a band secured to the end of the pipe and engaging the end corrugation thereof and projecting beyond the end of the pipe, a roll formed by that portion of the band projecting beyond the pipe, and a rod inclosed by said roll and having one of its ends set back to form within the roll a socket at one side of the joint in the band and having the other end projecting from the roll so as to engage said socket, combined substantially as set forth.

WILLIAM P. DU CHEMIN.

Witnesses:
E. H. WEYMAN,
J. T. SEIBOLD.